United States Patent
Farrar

(10) Patent No.: US 10,343,705 B1
(45) Date of Patent: Jul. 9, 2019

(54) STROLLER HAVING WHEELS WITH INTEGRAL SKIS

(71) Applicant: Eric Farrar, Garner, NC (US)

(72) Inventor: Eric Farrar, Garner, NC (US)

(*) Notice: Subject to any disclaimer, the term of this patent is extended or adjusted under 35 U.S.C. 154(b) by 0 days.

(21) Appl. No.: 15/973,593

(22) Filed: May 8, 2018

(51) Int. Cl.
| | |
|---|---|
| B62B 7/00 | (2006.01) |
| B62B 13/18 | (2006.01) |
| B62B 7/12 | (2006.01) |
| B62B 9/14 | (2006.01) |
| B62B 9/24 | (2006.01) |
| B62B 9/20 | (2006.01) |
| B62B 9/10 | (2006.01) |

(52) U.S. Cl.
CPC ............. *B62B 13/18* (2013.01); *B62B 7/12* (2013.01); *B62B 9/102* (2013.01); *B62B 9/142* (2013.01); *B62B 9/206* (2013.01); *B62B 9/24* (2013.01); *B62B 2206/003* (2013.01); *B62B 2206/006* (2013.01)

(58) Field of Classification Search
CPC ........... B62B 19/02; B62B 13/18; B62B 7/12; B62B 9/102; B62B 9/24
See application file for complete search history.

(56) References Cited

U.S. PATENT DOCUMENTS

| | | | | |
|---|---|---|---|---|
| 1,416,454 A | * | 5/1922 | Douglas | B62B 13/18 |
| | | | | 280/10 |
| 1,714,902 A | * | 5/1929 | Croswell | B62B 13/18 |
| | | | | 280/9 |
| 2,539,686 A | * | 1/1951 | Balientine | B62B 19/02 |
| | | | | 280/10 |
| 2,817,536 A | * | 12/1957 | Taggert | B62B 19/02 |
| | | | | 280/11 |
| 3,774,926 A | * | 11/1973 | Chase | B62B 19/02 |
| | | | | 280/13 |
| 4,479,657 A | | 10/1984 | Reynolds | |
| D313,377 S | | 1/1991 | Anderson | |
| 5,393,122 A | | 2/1995 | Andrisin, III | |
| 5,407,217 A | * | 4/1995 | Lambert | B62B 19/02 |
| | | | | 280/10 |
| 5,427,390 A | | 6/1995 | Duncan | |
| 5,911,422 A | | 6/1999 | Carpenter | |
| 6,708,989 B1 | | 3/2004 | Braun | |
| 6,824,148 B1 | | 11/2004 | Key | |
| 7,121,560 B1 | | 10/2006 | Balzano | |
| 7,364,170 B2 | * | 4/2008 | Aittama | B62B 13/18 |
| | | | | 280/10 |

* cited by examiner

*Primary Examiner* — Hau V Phan
(74) *Attorney, Agent, or Firm* — Kyle A. Fletcher, Esq.

(57) ABSTRACT

The stroller having wheels with integral skis is a stroller that can be rolled on wheels or pushed on skis. The skis are integral to the stroller can may be deployed by pulling a handle at the bottom rear of the stroller. Pulling the handle causes a first cable to rotate a distribution bar which causes a second cable and a third cable to be pulled. Pulling the second cable causes rotation of the front axle, which pivots the front skis into position below the front wheels. Pulling the third cable causes rotation of the rear axle, which pivots the rear skis into position below the rear wheels. The handle may be placed into a catch to hold the skis in the deployed position. When the handle is released, a torsion spring in each wheel may cause the skis to return to their positions above the wheels.

19 Claims, 4 Drawing Sheets

STROLLER HAVING WHEELS WITH INTEGRAL SKIS

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

Field of the Invention

The present invention relates to the fields of infant and toddler equipment, more specifically, a stroller having wheels with integral skis.

SUMMARY OF INVENTION

The stroller having wheels with integral skis is a stroller that can be rolled on wheels or pushed on skis. The skis are integral to the stroller can may be deployed by pulling a handle at the bottom rear of the stroller. Pulling the handle causes a first cable to rotate a distribution bar which causes a second cable and a third cable to be pulled. Pulling the second cable causes rotation of the front axle, which pivots the front skis into position below the front wheels. Pulling the third cable causes rotation of the rear axle, which pivots the rear skis into position below the rear wheels. The handle may be placed into a catch to hold the skis in the deployed position. When the handle is released, a torsion spring in each wheel may cause the skis to return to their positions above the wheels.

An object of the invention is to provide a stroller that rolls on wheels or pushes on skis.

Another object of the invention is to deploy skis into positions below each wheel when a handle is pulled.

A further object of the invention is to return the skis to their non-deployed positions when the handle is released Yet another object of the invention is to provide torsion springs to move the skis to their non-deployed positions.

These together with additional objects, features and advantages of the stroller having wheels with integral skis will be readily apparent to those of ordinary skill in the art upon reading the following detailed description of the presently preferred, but nonetheless illustrative, embodiments when taken in conjunction with the accompanying drawings.

In this respect, before explaining the current embodiments of the stroller having wheels with integral skis in detail, it is to be understood that the stroller having wheels with integral skis is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the stroller having wheels with integral skis.

It is therefore important that the claims be regarded as including such equivalent construction insofar as they do not depart from the spirit and scope of the stroller having wheels with integral skis. It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the appended claims.

DETAILED DESCRIPTION OF THE EMBODIMENT

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description. As used herein, the word "or" is intended to be inclusive.

Figure 1:
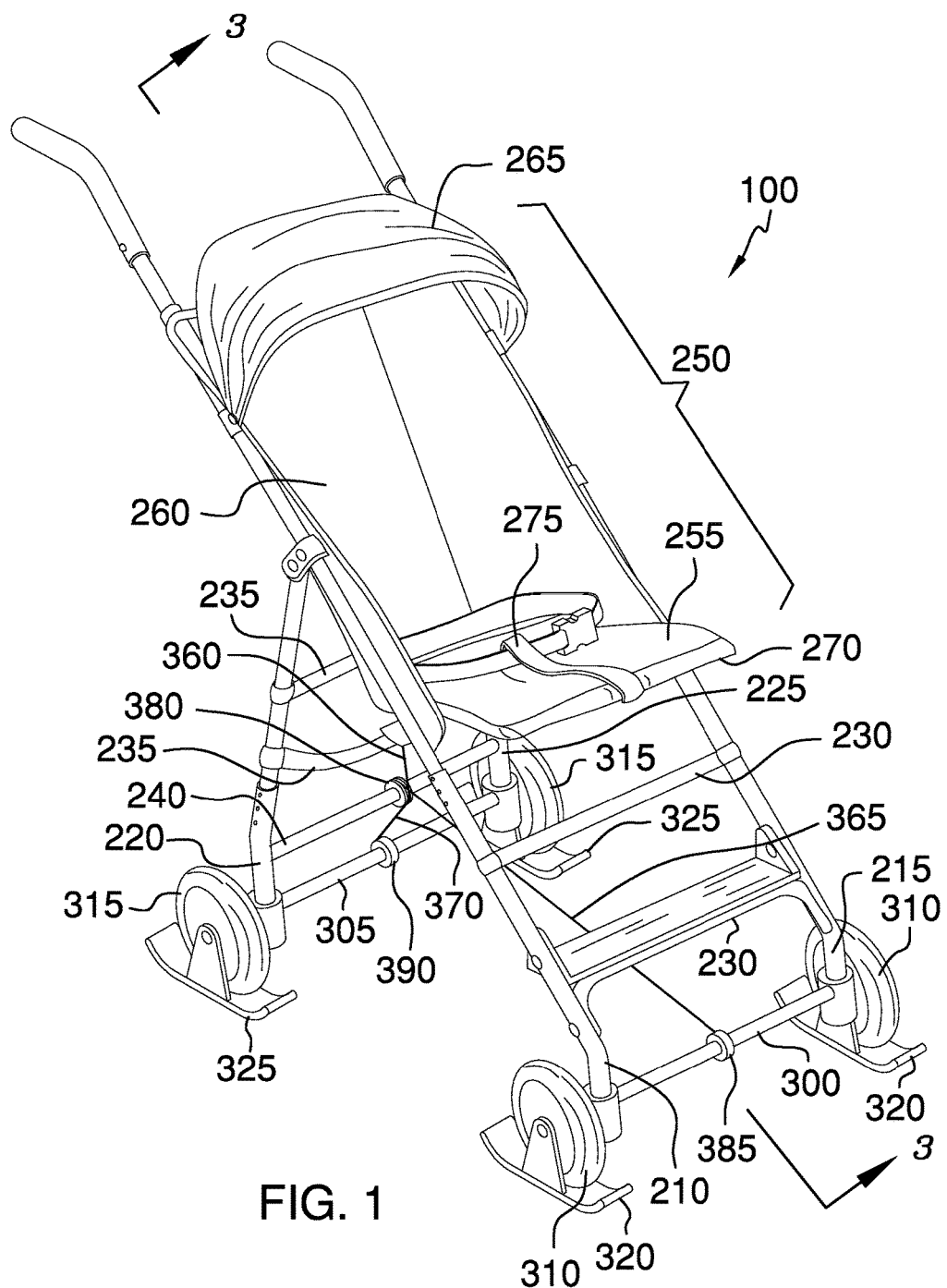
FIG. 1 is a perspective view of an embodiment of the disclosure.
Figure 2:
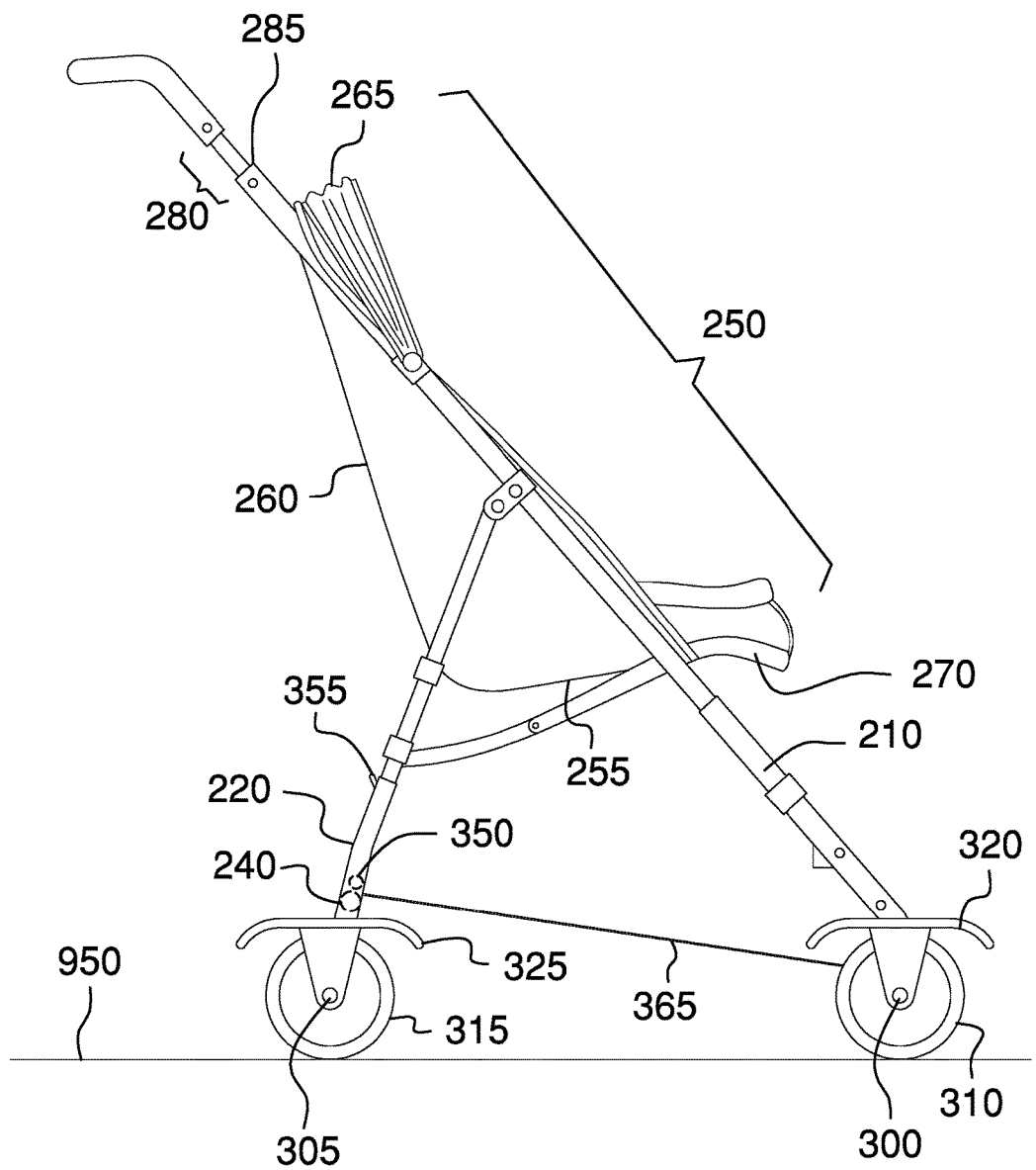
FIG. 2 is a side view of an embodiment of the disclosure.
Figure 3:
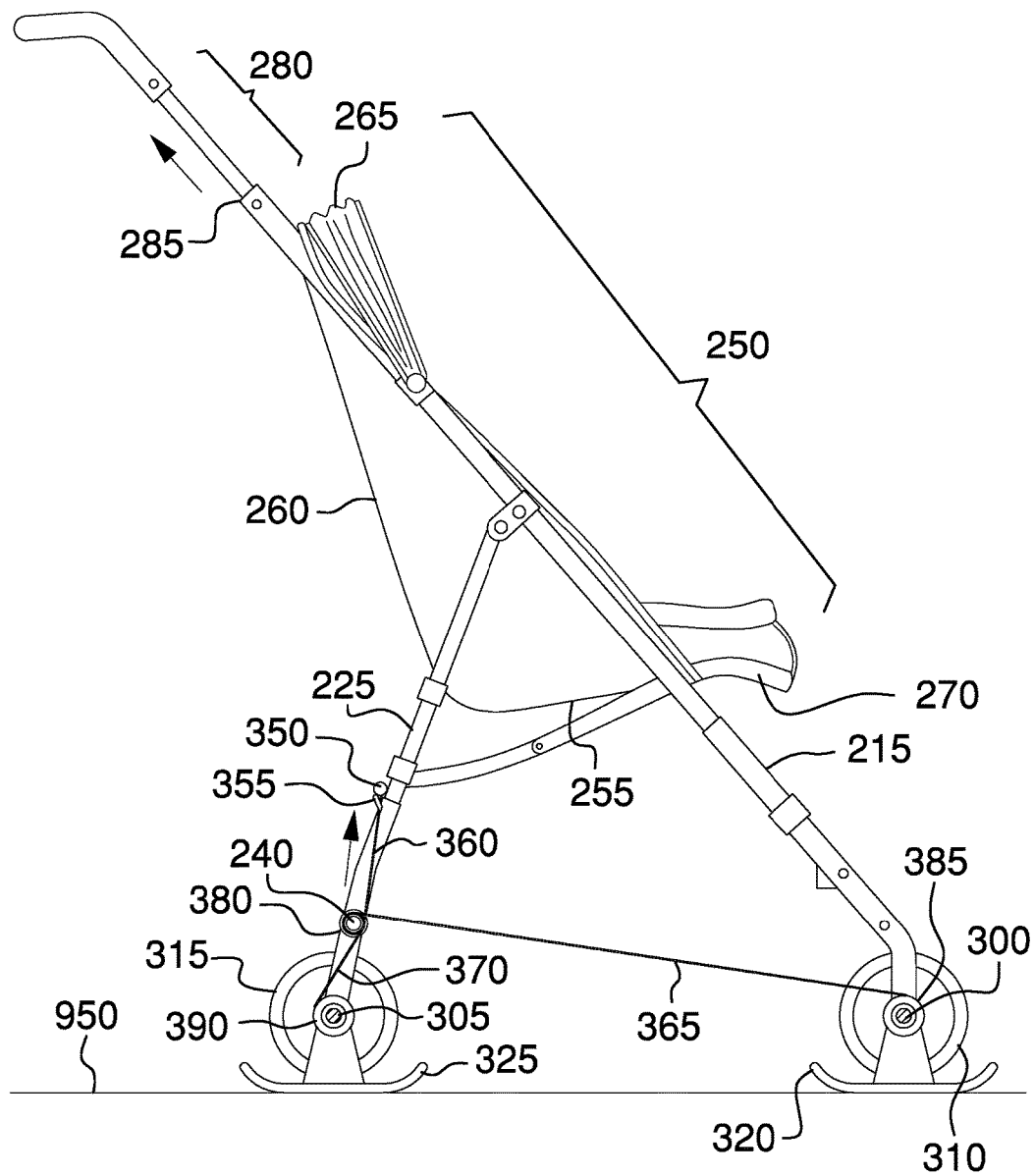
FIG. 3 is a cross-sectional view of an embodiment of the disclosure across 3-3 as shown in FIG. 1.
Figure 4:
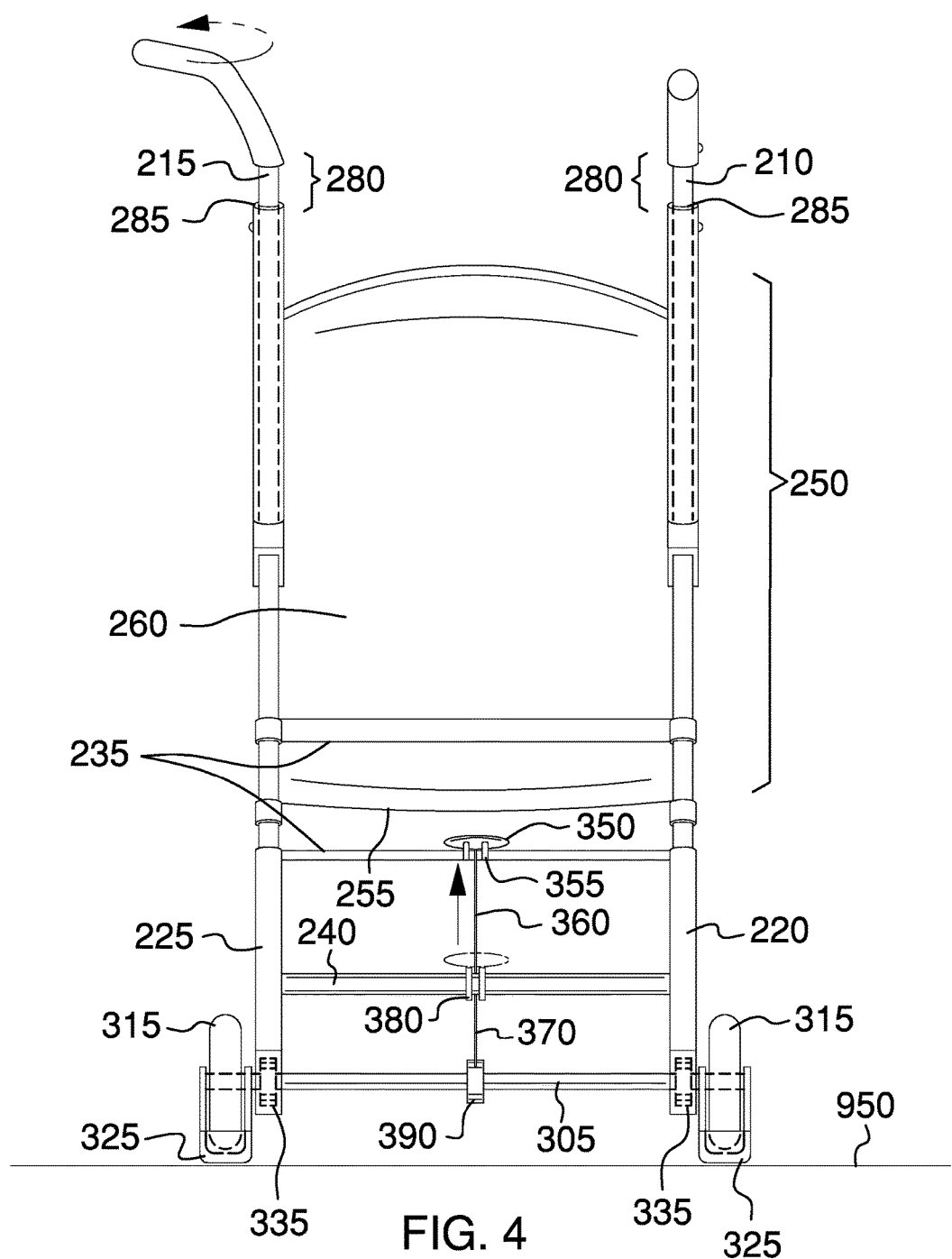
FIG. 4 is a rear view of an embodiment of the disclosure.

Detailed reference will now be made to a first potential embodiment of the disclosure, which is illustrated in FIGS. 1 through 4.

The stroller having wheels with integral skis 100 (hereinafter invention) comprises a front axle 300, a rear axle 305, four wheels, four skis, a pair of front torsion springs (not illustrated in the figures), a pair of rear torsion springs 335, a pull handle 350, a first reel 380, a second reel 385, a third reel 390, a first cable 360, a second cable 365, a third cable 370, a frame, and a seating area 250. The invention 100 is a collapsible stroller adapted to carry an infant or toddler (not illustrated in the figures). The invention 100 may make contact with the ground 950 via the four wheels by default. When the invention 100 is on a yielding or slippery surface, the four skis may be deployed to contact the ground 950 by pulling the pull handle 350. As non-limiting examples, the yielding or slippery surfaces may comprise sand, snow, and ice.

The front axle 300 may be a rod extending laterally across the invention 100 at the front of the invention 100. The front axle 300 may be pivotably coupled to a left front leg 210 and to a right front leg 215. The front axle 300 may be pivotably coupled to a pair of front wheels 310. The front axle 300 may be coupled to a pair of front skis 320. The second reel 385 may be coupled to the front axle 300 at the center of the front axle 300. The pair of front torsion springs may be coupled to the front axle 300 at the left front leg 210 and at the right front leg 215 causing the front axle 300 to rotate in a direction that keeps the pair of front skis 320 above the front axle 300 unless counteracted by another force.

The rear axle 305 may be a rod extending laterally across the invention 100 at the rear of the invention 100. The rear axle 305 may be pivotably coupled to a left rear leg 220 and to a right rear leg 225. The rear axle 305 may be pivotably coupled to a pair of rear wheels 315. The rear axle 305 may be coupled to a pair of rear skis 325. The third reel 390 may be coupled to the rear axle 305 at the center of the rear axle 305. The pair of rear torsion springs 335 may be coupled to the rear axle 305 at the left rear leg 220 and at the right rear leg 225 causing the rear axle 305 to rotate in a direction that keeps the pair of rear skis 325 above the rear axle 305 unless counteracted by another force.

The four wheels may comprise the pair of front wheels 310 and the pair of rear wheels 315. The pair of front wheels 310 may be circular disks that are free to spin on the front axle 300. The pair of front wheels 310 may reduce friction between the invention 100 and the ground 950 as the invention 100 is pushed. The pair of front wheels 310 may be located on the outside ends of the front axle 300 after the front axle 300 passes through the left front leg 210 and through the right front leg 215 so that there is clearance for the pair of front skis 320 to pivot into positions above the pair of front wheels 310. The pair of rear wheels 315 may be circular disks that are free to spin on the rear axle 305. The pair of rear wheels 315 may reduce friction between the invention 100 and the ground 950 as the invention 100 is pushed. The pair of rear wheels 315 may be located on the outside ends of the rear axle 305 after the rear axle 305 passes through the left rear leg 220 and through the right rear leg 225 so that there is clearance for the pair of rear skis 325 to pivot into positions above the pair of rear wheels 315.

The four skis comprise the pair of front skis 320 and the pair of rear skis 325. The pair of front skis 320 may be strips of rigid or semi-rigid material. When the pair of front skis 320 are deployed they are moved to a position beneath the four wheels. The pair of front skis 320 may have an up-turned front edge and a flat bottom when they are deployed. When deployed, the pair of front skis 320 may reduce friction between the invention 100 and the ground 950 as the invention 100 is pushed over the yielding or slippery surface. The pair of rear skis 325 may be strips of rigid or semi-rigid material. When the pair of rear skis 325 are deployed they are moved to a position beneath the four wheels. The pair of rear skis 325 may have an up-turned front edge and a flat bottom when they are deployed. When deployed, the pair of rear skis 325 may reduce friction between the invention 100 and the ground 950 as the invention 100 is pushed over the yielding or slippery surface.

By default, the four skis are located above the four wheels and the four wheels are in contact with the ground 950. The four skis may be deployed to a position below the four wheels by pulling the pull handle 350 up. The pull handle 350 may be a grip coupled to the top of the first cable 360. The bottom of the first cable 360 may be coupled to and wrapped around the first reel 380. The first reel 380 may be coupled to the center of a distribution bar 240. The distribution bar 240 may be pivotably coupled to the left rear leg 220 and the right rear leg 225. Pulling the pull handle 350 may cause the first cable 360 to rotate the first reel 380, which in turn may cause rotation of the distribution bar 240.

The distribution bar 240 may be coupled to the top of the second cable 365 and to the top of the third cable 370. The bottom of the second cable 365 may be coupled to and wrapped around the second reel 385. The bottom of the third cable 370 may be coupled to and wrapped around the third reel 390. The rotation of the distribution bar 240 may pull the second cable 365 and the third cable 370 by causing the second cable 365 and the third cable 370 to wrap around the distribution bar 240 or around the first reel 380. As the second cable 365 is pulled, it may cause rotation of the second reel 385 and the front axle 300, causing the pair of front skis 320 to move into position below the front axle 300. As the third cable 370 is pulled, it may cause rotation of the third reel 390 and the rear axle 305, causing the pair of rear skis 325 to move into position below the rear axle 305.

When the pull handle 350 is pulled, it may be placed in a handle catch 355 to keep the first cable 360 pulled. The handle catch 355 may be a handle retainer that is coupled to one of a plurality of rear crossbars 235 located above the distribution bar 240. As a non-limiting example, the handle catch 355 may be a pair of hooks.

The frame may be a support structure for the invention 100. The frame may comprise the left front leg 210, the right front leg 215, the left rear leg 220 the right rear leg 225, a plurality of front crossbars 230, the plurality of rear crossbars 235, and a seat frame 270. The left front leg 210 and the right front leg 215 may run from the lower front of the invention 100 to the upper rear of the invention 100 on the left and right sides, respectively. At the upper rear of the invention 100, the left front leg 210 and the right front leg 215 may bend to form handles to be used as a gripping area while pushing the invention 100. The top of the left front leg 210 and the top of the right front leg 215 may each comprise a height adjustment 280 for adjusting the height of the invention 100. Each of the height adjustments 280 may comprise a pivot joint 285. The pivot joints 285 may allow the top of the left front leg 210 and the top of the right front leg 215 to pivot so that the invention 100 folds flat for storage and transport.

The left rear leg 220 may be hingedly coupled to the left front leg 210 at a midpoint of the left front leg 210. The left rear leg 220 may run from the point where it hinges to the left front leg 210 to the lower rear of the invention 100. The right rear leg 225 may be hingedly coupled to the right front leg 215 at a midpoint of the right front leg 215. The right rear leg 225 may run from the point where it hinges to the right front leg 215 to the lower rear of the invention 100. The invention 100 may fold for storage and transportation by pivoting the left rear leg 220 and the right rear leg 225 forward.

The left front leg 210 and the right front leg 215 may be coupled to each other via the plurality of front crossbars 230. The left rear leg 220 and the right rear leg 225 may be coupled to each other via the plurality of rear crossbars 235. The distribution bar 240 may be one of the plurality of rear crossbars 235. The seat frame 270 may be an armature that partially or entirely surrounds a seat bottom 255. The seat frame 270 may be pivotably coupled to the left front leg 210 and to the right front leg 215. In some embodiments, the seat frame 270 may extend rearwards and slidably couple with the left rear leg 220 and with the right rear leg 225.

The seating area 250 comprises the seat bottom 255 and a seat back 260. The seat bottom 255 may be a flexible material suspended horizontally from the seat frame 270 between the left front leg 210 and the right front leg 215. The seat back 260 may be a flexible material suspended vertically from the left front leg 210, the right front leg 215, and one of the plurality of front crossbars 230. The bottom of the seat back 260 may be coupled to the back of the seat bottom 255. The seating area 250 may comprise a safety harness 275. The safety harness 275 may be adapted to hold the infant or toddler in the seating area 250. In some embodiments, the seat bottom 255 and the seat back 260 may be one piece of material.

In some embodiments, the invention 100 may comprise a sun screen 265. The sun screen 265 may be a flexible material with a wire support frame hingedly coupled to the left front leg 210 and to the right front leg 215. The sun screen 265 may be deployed by pulling the front edge of the sun screen 265 forward to stretch the sun screen 265 such that the sun screen 265 provides shade for the seating area 250.

The invention 100 may further comprise wheel locks, a cup holder, an accessory pouch, and other accessories commonly found on strollers.

In use, the invention 100 may be prepared for use by unfolding the left rear leg 220 and the right rear leg 225 from their positions against the left front leg 210 and the right front leg 215. If the invention 100 will be pushed over a paved surface, the pull handle 350 may be released from the handle catch 355. When the pull handle 350 is released, the pair of front torsion springs and the pair of rear torsion springs 335 cause the front axle 300 and the rear axles 305 to rotate in a direction where the four skis pivot to a position above the four wheels. If the invention 100 will be pushed over a yielding or slippery surface, the pull handle 350 may be pulled and placed into the handle catch 355. Pulling the pull handle 350 will cause the front axle 300 and the rear axle 305 to rotate in a direction where the four skis pivot to a position below the four wheels. With the four skis in a desired position, the infant or toddler may be placed in the seating area 250 and strapped in using the safety harness 275. The invention 100 may then be pushed forward to convey the infant or toddler.

Unless otherwise stated, the words "up", "down", "top", "bottom", "upper", and "lower" should be interpreted within a gravitational framework. "Down" is the direction that gravity would pull an object. "Up" is the opposite of "down". "Bottom" is the part of an object that is down farther than any other part of the object. "Top" is the part of an object that is up farther than any other part of the object. "Upper" refers to top and "lower" refers to the bottom. As a non-limiting example, the upper end of a vertical shaft is the top end of the vertical shaft.

As used in this disclosure, an "accessory" is a second object that adds to the convenience or attractiveness of a first object. In some instances, an accessory may extend the functionality of the first object by allowing the combination of the accessory plus the first object to perform a task that the first object could not perform alone.

As used in this disclosure, an "axle" is a cylindrical shaft that is inserted through the center of an object such that the center axis of the object and the center axis of the axle are aligned and the object can rotate using the axle as an axis of rotation.

As used herein, the words "couple", "couples", "coupled" or "coupling", refer to connecting, either directly or indirectly, and does not necessarily imply a mechanical connection.

As used herein, the word "desired" refers to a specific value within a range of supported values. A "desired" value indicates that a range of values is enabled by the invention and that a user of the invention may select a specific value within the supported range of values based upon their own personal preference. As a non-limiting example, for a fan that supports operational speed settings of low, medium, or high, a user may select a desired fan speed, meaning that the user may select low, medium, or high speed based upon their needs and preferences at the time of the selection.

As used in this disclosure, "flexible" refers to an object or material which will deform when a force is applied to it, which will not return to its original shape when the deforming force is removed, and which may not retain the deformed shape caused by the deforming force.

As used herein, "front" indicates the side of an object that is closest to a forward direction of travel under normal use of the object or the side or part of an object that normally presents itself to view or that is normally used first. "Rear" or "back' refers to the side that is opposite the front.

As used in this disclosure, a "grip" is a covering that is placed over a hand hold, handle, shaft, or other object.

As used in this disclosure, a "handle" is an object by which a tool, object, or door is held or manipulated with the hand.

As used in this disclosure, a "harness" is an apparatus comprising a plurality of straps and one or more fasteners that is used to fasten or anchor a first person or first object to a second object. The phrase "N point harness" refers to the installation of the harness wherein the harness has N anchor points. As a non-limiting example, a 2 point harness has two anchor points while a 5 point harness has 5 anchor points.

As used herein, the term "height adjustment" refers to a mechanism that allows the overall height of an armature or stanchion to change by releasing a locking mechanism, adjusting a position, and re-engaging the locking mechanism. As a non-limiting example, the locking mechanism may comprise a plurality of holes in a first armature and a plurality of holes in a second armature with a pin passing through the holes when they are in alignment. As a further non-limiting example, the locating mechanism may comprise a spring-loaded button on an inside armature that pops through one of a plurality of holes in an outside armature and which can be pressed into the hole to release the locking mechanism.

As used in this disclosure, the word "lateral" refers to the sides of an object or movement towards a side. Lateral directions are generally perpendicular to longitudinal directions. "Laterally" refers to movement in a lateral direction.

As used here, the word "midpoint" refers to a point near the center of an object. An "exact midpoint" refers to a midpoint that is equidistant from edges of the object in at least one direction. Unless otherwise stated, a midpoint is not required to be at the exact center of the object but instead may be within 50% of the distance from the exact midpoint to the farthest edge.

As used herein, the word "pivot" is intended to include any mechanical arrangement that allows for rotational motion. Non-limiting examples of pivots may include hinges, holes, posts, dowels, pins, points, rods, shafts, balls, and sockets, either individually or in combination.

As used herein, a "reel" refers to a cylindrical object with side walls around which a wire, filament, thread, cord, cable, string, line, rope, or other rope-like object is wound.

As used in this disclosure, "resilient" or "semi-rigid" refer to an object or material which will deform when a force is applied to it and which will return to its original shape when the deforming force is removed.

As used in this disclosure, a "rod" is a straight structure in which two dimensions of the structure appear thin relative to a third dimension of the straight structure.

As used in this disclosure, a "spring" is a device that is used to store mechanical energy. This mechanical energy will often be stored by deforming an elastomeric material that is used to make the device, by the application of a torque to a rigid structure, or by a combination thereof. In some embodiments, the rigid structure to which torque is applied may be composed of metal or plastic.

As used in this disclosure, a "wheel" is a circular object that revolves around an axle or an axis and is fixed below an object to enable it to move easily over the ground.

With respect to the above description, it is to be realized that the optimum dimensional relationship for the various components of the invention described above and in FIGS. 1 through 4, include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

The inventor claims:

1. A stroller having wheels with integral skis comprising:
   a front axle, a rear axle, four wheels, four skis, a pair of front torsion springs, a pair of rear torsion springs, a pull handle, a first reel, a second reel, a third reel, a first cable, a second cable, a third cable, a frame, and a seating area;
   wherein the stroller is adapted to carry an infant or toddler;
   wherein the stroller makes contact with the ground via the four wheels by default;
   wherein when the stroller is on a yielding or slippery surface, the four skis are deployed to contact the ground by pulling the pull handle.

2. The stroller having wheels with integral skis according to claim 1
   wherein the front axle is a rod extending laterally across the the front of the stroller;
   wherein the front axle is pivotably coupled to a left front leg and to a right front leg;
   wherein the front axle is pivotablly coupled to a pair of front wheels of the four wheels;
   wherein the front axle is coupled to a pair of front skis of the four skis;
   wherein the second reel is coupled to the front axle at the center of the front axle;
   wherein the pair of front torsion springs are coupled to the front axle at the left front leg and at the right front leg causing the front axle to rotate in a direction that keeps the pair of front skis above the front axle unless counteracted by another force.

3. The stroller having wheels with integral skis according to claim 2
   wherein the rear axle is a rod extending laterally across the stroller;
   wherein the rear axle is pivotably coupled to a left rear leg and to a right rear leg;
   wherein the rear axle is pivotablly coupled to a pair of rear wheels;
   wherein the rear axle is coupled to a pair of rear skis;
   wherein the third reel is coupled to the rear axle at the center of the rear axle;
   wherein the pair of rear torsion springs are coupled to the rear axle at the left rear leg and at the right rear leg causing the rear axle to rotate in a direction that keeps the pair of rear skis above the rear axle unless counteracted by another force.

4. The stroller having wheels with integral skis according to claim 3
   wherein the four wheels comprise the pair of front wheels and the pair of rear wheels;
   wherein the pair of front wheels are circular disks that are free to spin on the front axle;
   wherein the pair of front wheels reduce friction between the stroller having wheels with integral skis and the ground as the stroller is pushed;
   wherein the pair of front wheels are located on the outside ends of the front axle after the front axle passes through the left front leg and through the right front leg so that there is clearance for the pair of front skis to pivot into positions above the pair of front wheels;
   wherein the pair of rear wheels are circular disks that are free to spin on the rear axle;
   wherein the pair of rear wheels reduce friction between the stroller and the ground as the stroller is pushed;
   wherein the pair of rear wheels are located on the outside ends of the rear axle after the rear axle passes through the left rear leg and through the right rear leg so that there is clearance for the pair of rear skis to pivot into positions above the pair of rear wheels.

5. The stroller having wheels with integral skis according to claim 4
   wherein the four skis comprise the pair of front skis and the pair of rear skis;
   wherein the pair of front skis are strips of rigid or semi-rigid material;
   wherein when the pair of front skis are deployed they are moved to a position beneath the four wheels;
   wherein the pair of front skis have an up-turned front edge and a flat bottom when they are deployed;
   wherein when deployed, the pair of front skis reduce friction between the stroller and the ground as the stroller is pushed over the yielding or slippery surface;
   wherein the pair of rear skis are strips of rigid or semi-rigid material;
   wherein when the pair of rear skis are deployed they are moved to a position beneath the four wheels;
   wherein the pair of rear skis have an up-turned front edge and a flat bottom when they are deployed;
   wherein when deployed, the pair of rear skis reduce friction between the stroller having and the ground as the stroller is pushed over the yielding or slippery surface.

6. The stroller having wheels with integral skis according to claim 5
   wherein the four skis are located above the four wheels and the four wheels are in contact with the ground by default;
   wherein the four skis are deployed to a position below the four wheels by pulling the pull handle up;
   wherein the pull handle is a grip coupled to the top of the first cable.

7. The stroller having wheels with integral skis according to claim 6
   wherein the bottom of the first cable is coupled to and wrapped around the first reel;

wherein the first reel is coupled to the center of a distribution bar;

wherein the distribution bar is pivotably coupled to the left rear leg and the right rear leg;

wherein pulling the pull handle causes the first cable to rotate the first reel, which in turn causes rotation of the distribution bar.

8. The stroller having wheels with integral skis according to claim 7 wherein the distribution bar is coupled to the top of the second cable and to the top of the third cable.

9. The stroller having wheels with integral skis according to claim 8 wherein the bottom of the second cable is coupled to and wrapped around the second reel;

wherein the bottom of the third cable is coupled to and wrapped around the third reel;

wherein the rotation of the distribution bar pulls the second cable and the third cable by causing the second cable and the third cable to wrap around the distribution bar or around the first reel;

wherein as the second cable is pulled, it causes rotation of the second reel and the front axle, causing the pair of front skis to move into position below the front axle;

wherein as the third cable is pulled, it causes rotation of the third reel and the rear axle, causing the pair of rear skis to move into position below the rear axle.

10. The stroller having wheels with integral skis according to claim 9 wherein when the pull handle is pulled, it is placed in a handle catch to keep the first cable pulled;

wherein the handle catch is a handle retainer that is coupled to one of a plurality of rear crossbars located above the distribution bar.

11. The stroller having wheels with integral skis according to claim 10 wherein the handle catch is a pair of hooks.

12. The stroller having wheels with integral skis according to claim 10 wherein the frame is a support structure for the stroller;

wherein the frame comprises the left front leg, the right front leg, the left rear leg the right rear leg, a plurality of front crossbars, the plurality of rear crossbars, and a seat frame;

wherein the left front leg and the right front leg run from the lower front of the stroller to the upper rear of the stroller skis on the left and right sides, respectively;

wherein at the upper rear of the stroller, the left front leg and the right front leg bend to form handles to be used as a gripping area while pushing the stroller.

13. The stroller having wheels with integral skis according to claim 12 wherein the top of the left front leg and the top of the right front leg each comprise a height adjustment for adjusting the height of the stroller;

wherein each of the height adjustments comprise a pivot joint;

wherein the pivot joints allow the top of the left front leg and the top of the right front leg to pivot so that the stroller folds flat for storage and transport.

14. The stroller having wheels with integral skis according to claim 13 wherein the left rear leg is hingedly coupled to the left front leg at a midpoint of the left front leg;

wherein the left rear leg runs from the point where it hinges to the left front leg to the lower rear of the stroller;

wherein the right rear leg is hingedly coupled to the right front leg at a midpoint of the right front leg;

wherein the right rear leg runs from the point where it hinges to the right front leg to the lower rear of the stroller;

wherein the stroller folds for storage and transportation by pivoting the left rear leg and the right rear leg forward.

15. The stroller having wheels with integral skis according to claim 14 wherein the left front leg and the right front leg are coupled to each other via the plurality of front crossbars;

wherein the left rear leg and the right rear leg are coupled to each other via the plurality of rear crossbars;

wherein the seat frame is an armature that partially or entirely surrounds a seat bottom;

wherein the seat frame is pivotably coupled to the left front leg and to the right front leg.

16. The stroller having wheels with integral skis according to claim 15 wherein the seat frame extends rearwards and slidably couples with the left rear leg and with the right rear leg.

17. The stroller having wheels with integral skis according to claim 16 wherein the seating area comprises the seat bottom and a seat back;

wherein the seat bottom is a flexible material suspended horizontally from the seat frame between the left front leg and the right front leg;

wherein the seat back is a flexible material suspended vertically from the left front leg, the right front leg, and one of the plurality of front crossbars;

wherein the bottom of the seat back is coupled to the back of the seat bottom;

wherein the seating area comprises a safety harness;

wherein the safety harness is adapted to hold the infant or toddler in the seating area.

18. The stroller having wheels with integral skis according to claim 17 wherein the seat bottom and the seat back are one piece of material.

19. The stroller having wheels with integral skis according to claim 17 wherein the stroller comprises a sun screen;

wherein the sun screen is a flexible material with a wire support frame hingedly coupled to the left front leg and to the right front leg;

wherein the sun screen is deployed by pulling the front edge of the sun screen forward to stretch the sun screen such that the sun screen provides shade for the seating area.

* * * * *